United States Patent Office 3,791,997
Patented Feb. 12, 1974

3,791,997
WATER VAPOR PERMEABLE FLEXIBLE
SHEET MATERIALS
George Stuart Hathorn and Victor Ralph Cunningham, Dagenham Dock, England, assignors to Porvair Limited, Essex, England
Continuation of abandoned application Ser. No. 697,165, Jan. 11, 1968. This application Nov. 19, 1970, Ser. No. 91,167
Claims priority, application Great Britain, Jan. 11, 1967, 1,611/67
Int. Cl. B29d 7/22, 27/04; C08g 22/04
U.S. Cl. 260—2.5 AY                 16 Claims

ABSTRACT OF THE DISCLOSURE

In a method of making water vapor permeable flexible sheet materials, which find uses as replacements for leather, which included two superimposed layers, a substrate layer is formed of a layer of a mixture of powdered removable filter dispensed through a polymer solution in which adheres to a temporary backer, and before the solvent is removed a top coat layer of a similar mixture is formed on the substrate layer, the polymer is coagulated and the filler leached out from both layers by suitable liquid treatment, the two superimposed layers are dried and stripped as one layer from the supports.

---

This is a continuation of application Ser. No. 697,165, filed Jan. 11, 1968, and now abandoned.

This invention relates to the making of water vapor permeable flexible porous sheet materials, more especially microporous materials, particularly, though not exclusively, man-made leather-like materials, by forming a spreadable mixture comprising a solution of a film forming flexible synthetic polymeric plastics working material in a solvent, forming a continuous layer of the mixture on a temporary support to which the layer adheres, treating the layer on the support with a coagulating liquid, which is a non-solvent for the working material, but is at least partially miscible with the solvent for the working material, so as to coagulate the working material into a microporous sheet, and washing with fresh coagulating liquid or continuing the treatment until substantially all the solvent has been removed, drying the resultant sheet material, and tearing or stripping it from the temporary support.

The invention is concerned with such methods in which, for one reason or another, the material is made in two superimposed layers. There may be various reasons for making the material in two layers. For example natural leather comprises a main fibre layer and a surface layer termed the grain layer, and in making an artificial leather it is often thought desirable to provide two layers having rather different properties to simulate these two layers of natural leather. In other cases the purpose of the exposed layer may be merely to give a pleasing appearance or a desired color while employing for the greater part of the thickness a material having other desirable qualities such as strength or toughness, or cheapness. Again it may be desirable that the exposed layer should be waterproof while the other layer may have a degree of water absorbency.

In certain known processes the difficulty has arisen that when the mixture for the second layer is applied to the already formed first layer, the solvent in the former partly dissolves the surface of the latter and adversely affects its structure, for example by collapsing its micropores and lowering its water vapor permeability. To overcome this difficulty it has been proposed to interpose a third or tie layer between the other two layers, the solvent for each layer being chosen so as not to dissolve or adversely affect the preceding layer. Naturally this adds considerably to the complexity of the method.

It has now been found that if the second layer mixture is deposited on the first layer mixture before coagulation of the latter, the two layers can be coagulated simultaneously and the difficulties referred to above do not arise.

Thus according to the present invention a method of making a water vapor permeable flexible sheet material includes forming a spreadable mixture comprising a solution of a film forming flexible synthetic thermoplastic elastomeric polymeric working material in a solvent, forming a continuous layer of the mixture on a temporary backer to which the layer adheres, and, before the solvent is removed, forming a second layer also of a spreadable mixture comprising a solution of a film forming flexible synthetic thermoplastic elastomeric polymeric working material in a solvent, on the surface of the first layer, treating both layers on the backer with a coagulating liquid which is a nonsolvent for the working material, but is at least partially miscible with the solvent for the working material, so as to coagulate the working material of both layers, removing substantially all the solvent by washing the material with a coagulating liquid, drying the sheet material and stripping it from the temporary support. The term washing includes merely immersing the material in a coagulating liquid.

Preferably the viscosity of the mixture forming the first layer is greater than the viscosity of the mixture forming the second layer. The viscosity of the first layer mixture may be greater than 700 poise, measured at 25° C.

In some cases it may be desirable to include in the mixture of either or both layers a removable solid filler ground to a narrow range of particle sizes, the filler being insoluble in the solvent for the working material but preferably soluble in the coagulating liquid, thus enabling the filler to be removed during or after the coagulation of the working material merely by continuing the treatment with the coagulating liquid.

Preferably the filler is ground so that more than 50% of the particles have a diameter within the range 4 to 20 microns. The average diameter of the particles may be in the range 10 to 14 microns, and is preferably 13 microns; the standard deviation on either side of the average being 4.5 microns. This particle size will be referred to as 13±4.5 microns (one standard deviation) in the rest of the specification. A suitable filler material is sodium chloride. These particle sizes are as measured by means of a Photoextinction Sedimentometer manufactured by Evans Electro Selenium Limited, Model No. 41 used in accordance with the manufacturers' instructions based on papers by H. E. Rose in "Engineering" of Mar. 31 and Apr. 14, 1950, and "Nature" of 1952, vol. 169, p. 287.

The mixture used to form the second layer may contain an amount of removable solid filler such that the ratio of filler to working material in the mixture is in the range 0.5:1 to 6:1 in parts by weight, and preferably 3:1 to 6:1. The mixture used to form the first layer may contain an amount of removable solid filler such that the ratio of the filler to working material is in the range 0.5:1 to 3:1 in parts by weight, and preferably 1.78:1.

In addition to simplifying the process the invention has or may have certain other advantages. Thus the simultaneous coagulation of the two layers tends to produce greater lamination strength, that is to say greater resistance to tearing apart of one layer from the other. In addition it is found that certain formulations have a tendency to produce what may be termed a "cellular structure" comprising a number of relatively large cells, or macropores big enough to be seen by the naked eye, in a microporous matrix, and this structure tends to have reduced toughness, wear resistance, or resistance to tear propagation. It is found that certain formulations which produce this cellular structure in the layers when made individually do not do so when the layers are simultaneously coagulated in accordance with the present invention.

In the mixture for the first layer the ratio of working material to solvent may be in the range 25:75 to 35:65 in parts by weight, and preferably 30:70.

In the mixture for the second layer, the proportion of working material to solvent may be in the range 20:80 to 30:70 in parts by weight, and preferably 25:75.

In the mixture used to form the first layer the ratio of filler to working material and working material to solvent may fall within the area defined by the closed figure DQLMD, for example AKLMA, preferably RSTUR, in the diagram, FIG. 5, of the accompanying drawings.

Provided the ratios fall within the area R-S-T-U-R macropores are unlikely to be produced in the substrate. However in the case of the particle sizes of the sodium chloride being at the low end of the range quoted above the tendency of sodium chloride to absorb moisture is increased and care must be taken to ensure that the preferred moisture content of 0.2–0.4% w. for the sodium chloride mentioned below is not exceeded and the milling conditions are such as to achieve homogeneous dispersions. In addition the coagulation temperature should be kept down if macropores are to be avoided.

Preferably the mixture used to form the first layer has a ratio of filler to polymeric working material of about 1.78:1 parts by weight and the mixture used to form the second layer has a ratio of filler to polymeric working material of about 3:1 and the filler is ground to an average particle diameter of 10 to 14 microns.

The mixture forming the first layer is preferably applied in such a way as to achieve a layer which has a thickness in the finished leached and dried product in the range 1.1 to 1.3 mm. The mixture used to form the second layer is preferably applied in such a way as to achieve a composite finished leached and dried microporous product whose overall thickness is in the range 1.6 to 1.8 mm. Both layers may be applied by knife coating.

The preferred working materials are polyurethanes derived from polyesters, polyethers or polycaprolactones.

Examples of polyester-based resins are those sold under the trade names Elastollan TN61 EH98AK and Texin. A suitable polyether-based resin is that sold as Elastollan TN63 PA98AK. A suitable caprolactone-based polyurethane is that sold as Elastollan TN65 EN98AK.

Solvents for the working material which may be employed include dimethyl formamide, dimethyl sulphoxide, N-methyl pyrrolidone and dimethyl acetamide, but the actual solvent chosen will depend on the working material employed. Thus for Elastollan TN61 EH98AK, dimethyl formamide is preferred.

Dimethyl formamide can be diluted with other cheaper solvents such as toluene and methyl ethyl ketone which although not solvents for the polyurethane on their own do not act as non solvents when mixed with dimethyl formamide.

A preferred working material for both layers is a thermoplastic elastomeric polyurethane derived from a polyester by reaction with a diol and a di-isocyanate, and in particular one in which the polyester comprises the condensation reaction product of adipic acid and ethylene glycol, the diol comprises 1,4-butylene glycol and the di-isocyanate comprises 4,4'-diphenylmethane-di-isocyanate, and the isocyanate is used in very slight molar excess. Part of the ethylene glycol may be replaced by 1,4-butylene glycol.

A preferred coagulating liquid is water, but other solvents, for example organic solvents, or mixtures of other solvents with water, may be used.

The temporary backer is preferably a sheet of porous synthetic plastics material, which may conveniently be formed by sintering powdered thermoplastic polymer. The thermoplastic polymer may be a high density polyethylene. One particular such backer which has been found suitable is .067"±.004" thick, has a permeability of 18±4 cubic ft./min. air at a pressure of 8" static water gauge and weighs 114 grams/sq. ft.

Desirably the backer has an ultimate tensile strength greater than 115 kg./cm.$^2$ and an elongation at break less than 25%.

An example of such a material is that sold under the trade name Vyon. Such a material is formed by spreading an even layer of Ziegler high density polyethylene powder on a smooth metal surface and then placing the smooth metal surface and the layer in a suitably heated oven to cause the particles to sinter. The surface of the resultant sintered sheet which was in contact with the smooth metal surface is smoother than the other face and it is on this smoother face that the layer is formed.

In a preferred form of the invention for both layers the filler is sodium chloride, the working material comprises thermoplastic elastomeric polyurethane derived from a polyester by reaction with a diol and a di-isocyanate, the solvent comprises dimethylformamide, and the mixtures are formed by dissolving the polyurethane in the dimethylformamide and then milling dried sodium chloride into the solution under conditions of low humidity until a homogenous dispersion is obtained. Preferably the moisture content of the sodium chloride is not greater than 0.2–0.4% by weight and the milling conditions are not more humid than 50% RH at 25° C. In this form of the invention the viscosity of the first layer mixture is greater than that of the second layer mixture and layers are knife coated onto the backer as it passes around a roll the first layer being applied to the backer between a first knife preferably vertical and an upstream inclined backing plate located before the first knife from the point of view of the movement of the backer and the second layer is applied between the first knife and a second knife located downstream from the first knife, the second layer thus being applied immediately on top of the first layer.

Preferably the coagulation is carried out by immersing the layer, on the backer, coated face downward in water at 20° C. Conveniently the material is immersed in the cold, for example at 20° C., in the coagulating liquid until insufficient solvent remains to cause collapse of the porous structure on heating and then the filler is removed to an adequate level by mangling the material in heated coagulating liquid, for example at 60° C., which is passed in countercurrent to the material.

The surface of the second layer of the leached and dried microporous product may be sprayed with a solvent for the working material so as to partially collapse the microporous structure of the surface whilst leaving the gas permeability of the treated surface still appreciably greater than that of the working material when in a non porous state. This treatment imparts a grain leather like appearance to the material and enables it to be used as a calf grain leather like man made material for example as a shoe upper material.

A typical product made in accordance with the invention as hereinafter specifically described, apart from the thicknesses of the substrate and top coat, and coagulating temperatures of 25–30° C. and leaching temperatures 70–80° C. has a substrate thickness of 0.95 mm., a top coat thickness of 0.75 mm. and a weight per unit area of 747.6 g./m.$^2$. Its breathability is indicated by a water vapor permeability of 1455 g./m.$^2$/24 hours (measured by the desiccant method), whilst its resistance to the ingress of liquid water is indicated by a hydrostatic head of 9 cm. Hg. The material is suitable for use as a shoe upper material.

The desiccant method for determining water vapor permeability is as described in B.S.S. 3177/1959 but carried out at 38° C. with a nominal humidity gradient of 100% relative humidity.

Hydrostatic head is measured by the method described in B.S.S. 2823.

The invention may be put into practice in various ways but one specific process embodying the invention will be described by way of example and with reference to the accompanying diagrams in which:

FIG. 1 is a flow diagram of the process;

FIG. 2 is a diagrammatic side elevation of a two head coating arrangement 400 and a coagulating tank 500 used to form a layer of substrate paste on the backer and a layer of top coat paste on top of the layer of substrate paste and to coagulate both layers, stages 40, 41 and 50 respectively in FIG. 1;

GENERAL DESCRIPTION OF THE PROCESS

Figure 1:
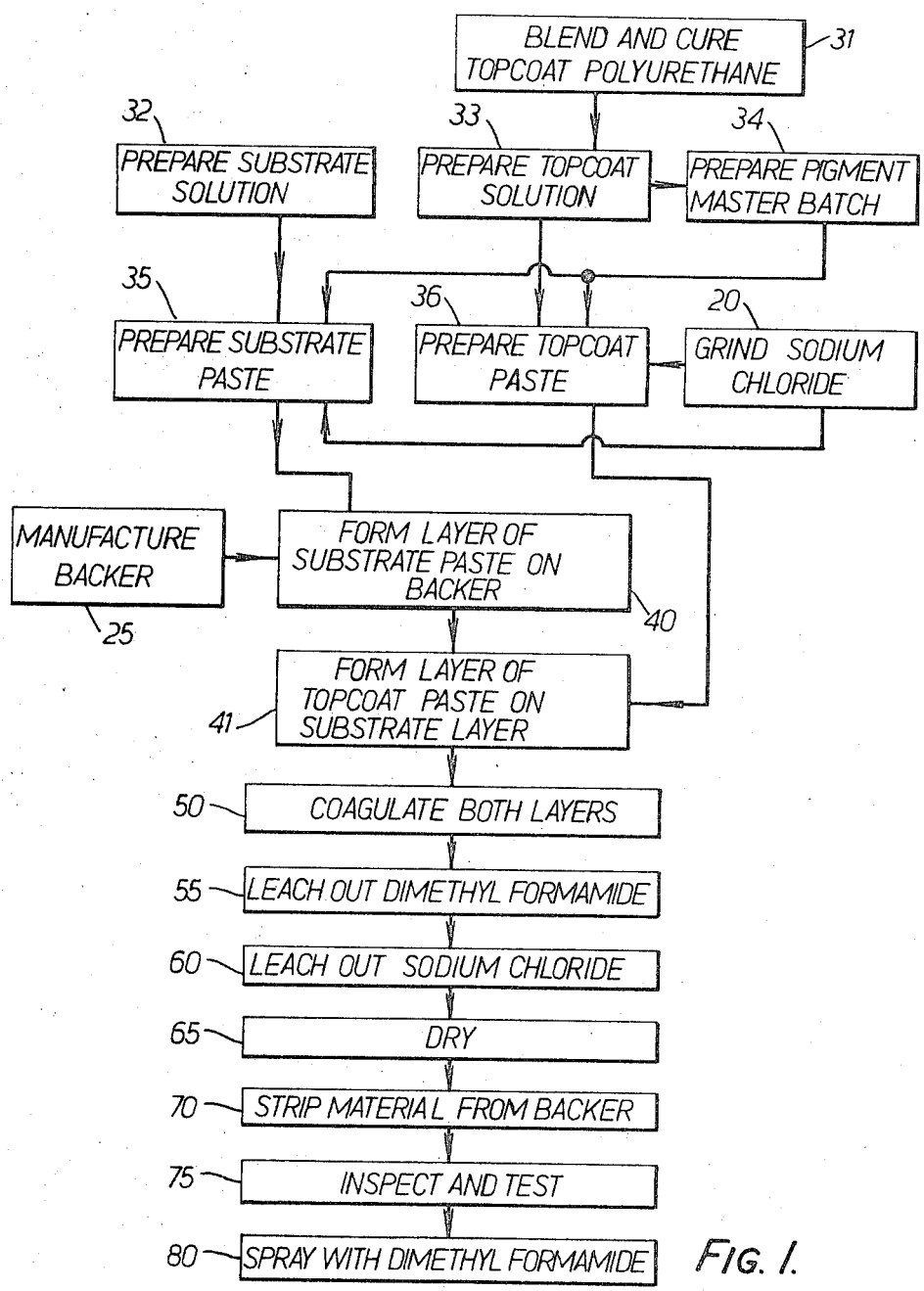

Referring to FIG. 1 the main stages of the process are numbered 31 to 80. There are two ancillary stages, those of grinding the sodium chloride to a narrow range of fine particle sizes, stage 20 and manufacturing the backer, stage 25. The backer is a sheet of porous sintered high density polyethylene and is formed by spreading an even layer of Ziegler high density polyethylene powder on a smooth metal conveyor belt, passing the layer on the belt through a suitably heated oven to cause the particles to sinter, cooling the sintered sheet and stripping it from the belt. The surface of the resultant sintered sheet which was in contact with the smooth metal surface is smoother than the other face, and it is on this smoother surface that the mixture is spread.

In general terms the main stages of the process consist of preparing two different pastes containing a solution of a polyester based polyurethane dissolved in dimethyl formamide, finely divided sodium chloride, and carbon black pigment, the first (or substrate paste) having more polymer, less salt, less pigment, and a higher viscosity than the second (or top coat) paste. These are stages 31 to 36.

A first layer of the first paste is spread on the backer and then immediately a thinner layer of the other paste is spread on top of the first layer. These are stages 40 and 41.

The coated backer, held under suitable tension throughout this stage of the process, is smoothly immersed, coated face down, in cold water and washed with cold water (20° C.) until the polyurethane has all been precipitated out of solution and all the dimethyl formamide has been removed. These are stages 50 and 55. The remainder of the sodium chloride is then removed by leaching with water heated at 60° C. and the material dried with the top coat uppermost, care being taken that the heating does not warp the backer. Twenty minutes in an oven at 120° C. is suitable. These are stages 60 and 65.

After being dried it is carefully stripped from the backer. This is stage 70. It may be easier to do this whilst the material is still hot. This process imparts a fibrous or flesh surface appearance to the substrate surface which was in adherence with the backer.

The backer is then treated to enable it to be reused if possible and returned to stage 25 of the process for reuse or recovery.

The material is then inspected and tested, and if it comes up to specification is given a surface finishing treatment by spraying with dimethyl formamide and drying. This is stage 80. This imparts a high quality calf grain appearance to the top coat surface.

STAGE 20 GRINDING THE SALT

Satisfactory results are obtained when the majority of the particles are between 4 and 20 microns in diameter, the preferred average particle diameter being 13±4.5 microns (one standard deviation). The particle size of the salt is measured on a Photoextinction Sedimentometer manufactured by Evans Electro Selenium Limited, Model No. 41 used in accordance with the manufacturers' instructions based on papers by H. E. Rose in "Engineering" of Mar. 31 and Apr. 14, 1950, and "Nature" of 1952, vol. 169, p. 287. Care must be taken to ensure that the particles in the test suspension have not agglomerated and this can be achieved by applying ultrasonic vibrations to the test suspension, these of course must be such as not to break up the individual particles but merely any agglomerates. The grinding is performed by recirculating the sodium chloride between a grinder producing particles somewhat on the coarse side and a classifier which separates the particles that are too coarse and returns them to the grinder. Typically approximately 50% of the total mass is returned for regrinding. The grinder may be of the type comprising a pair of co-axial discs which can be rotated at different speeds or in opposite directions, each disc having concentric rings of pegs projecting from it and lying between the rings of pegs of the companion disc.

The material which is ground consists of sodium chloride crystals having a moisture content not in excess of 0.2–0.4% w. to which are added between 0.4 and 0.7% w. of a co-precipitated lime and silica anti-caking agent of 0.55 microns (55 A.) average particle diameter, for example that sold as Microcal 160 (trademark). The ground sodium chloride is sealed in cans and stored under dry conditions so that the moisture content of the ground salt does not exceed 0.2–0.4% w. and is preferably about that value.

STAGE 25 MANUFACTURING THE BACKER

The temporary backer is a sheet of porous synthetic plastics material formed by spreading an even layer of Ziegler high density polyethylene powder on a smooth metal surface and then placing the smooth metal surface and the layer in a suitable heated oven to cause the particles to sinter. The surface of the resultant sintered sheet which was in contact with the smooth metal surface is smoother than the other face and it is on this smoother face that the layer is formed.

The material is 22" wide, 0.067"±0.004" thick, has a permeability of 18±4 cubic ft.air/minute at a pressure of 8" static water gauge and weighs 114 gram./ft.$^2$.

STAGES 31 TO 36 PREPARING THE SUBSTRATE AND TOP COAT PASTES

The working material from which the man-made leather-like water vapor permeable flexible sheet material is made is a polyester based polyurethane which is made as follows.

The starting material is a linear polyester containing hydroxyl groups which is made from adipic acid and ethylene glycol, which has a molecular weight of approximately 2,000, a hydroxyl index around 50 and an acid number of 1. 1,000 g. of this polyester is heated to approximately 120° C. with 90 g. 1,4-butylene glycol, both re-agents having been adequately dessicated beforehand. 400 g. of solid 4,4'-diphenylmethane di-isocyanate is added to the heated mixture with vigorous stirring, which is continued until the solid has dissolved, the temperature reaching about 100° C. After about two minutes the liquid is poured on to plates preheated to between 110° C. and 130° C. After about ten minutes the mass is stripped from the plates, allowed to cool to room temperature, and granulated in a conventional granulating machine. This material has a Shore hardness of 98 on the A scale at 25° C. A 10% w. solution in dimethylformamide has a viscosity of the order of 15 to 30 centipoise at 25° C.

In a modification of this material part of the ethylene glycol is replaced by 1,4-butylene glycol so that the basic polyester is in fact a copolymer of two diols.

The material may also contain conventional stabilizers.

Stage 32 of FIG. 1, preparing the substrate solution, is carried out by weighing out 3 parts by weight of this polymer and dissolving this in 7 parts by weight of dry dimethylformamide (less than 0.01% of moisture, supplied by I.C.I. Ltd. in accordance with their specification for dry dimethylformamide) in a vertical mixer with a high rate of shear, e.g. a Silverson mixer. Care must be taken to keep the temperature below 40° C. during mixing or degradation of the polyurethane is liable to occur. The substrate solution is stored under dry conditions.

Care must be taken when handling dimethylformamide solutions since the vapor is toxic and also hygroscopic. Thus when possible the mixing stages are enclosed and are kept at low humidity ideally less than 50% RH at 25° C.

Stages 31 and 33, blending and curing the top coat polyurethane and preparing the top coat solution are carried out in a ribbob blender and a Silverson mixer identical to that used for Stage 32.

The polymer of 15 to 30 centipoises viscosity at 25° C. in 10% w. solution is cured and blended dry.

The curing is carried out at 75° C. under an inert atmosphere, e.g. of nitrogen until the viscosity of 10% w. solution of the cured polyurethane has risen to 70 to 90 centipoise at 25° C.

1 part by weight of the cured polyurethane is weighed out and mixed with 3 parts by weight of dry dimethylformamide in the same way as the substrate solution and stored under dry conditions.

The dimethylformamide is also stored under dry conditions.

Stage 34, preparing the pigment master batch, is carried out as follows. 60 parts by weight of top coat solution are filtered to remove any agglomerations or undissolved solids. The filtered solution is then placed in the pot of a five gallon paddle type mixer, where it is mixed with 30 parts by weight of dry dimethylformamide and 10 parts by weight of carbon black pigment of 20 milli-microns average particle diameter. The mixture is then milled on a Torrance triple roll mill to produce a homogeneous dispersion and stored under dry conditions.

The milling is carried out in an air conditioned enclosure the filtered heated air taken in being kept at 25° C. and a humidity of about 50% RH.

Stage 35, preparing the substrate paste, is carried out as follows. 100 parts by weight of filtered substrate solution are placed in a paddle type mixer, 1.5 parts by weight of the pigment master batch is added and 53.4 parts by weight of ground salt taken from sealed cans is added after being sieved through a 60 mesh British Standard screen in a vibratory sieve.

This is mixed in a paddle type mixer, and then milled on the triple roll mill to produce a homogeneous dispersion, which, when tested with a Hegman gauge gives a reading of 6.5–7 which is indicative that no particles greater than 14 microns in diameter are present. This dispersion, the substrate paste, is stored under dry conditions.

To summarize, the substrate paste has the following composition:

| | Parts by weight |
|---|---|
| Polyurethane (15–30 centipoise at 25° C.) | 30 |
| Polyurethane (70–90 centipoise at 25° C.) | 0.23 |
| Ground sodium chloride (average particle diameter 13±4.5 microns (one standard deviation)) | 53.4 |
| Dimethylformamide | 71.13 |
| Carbon black pigment | 0.15 |

It has a viscosity of the order of $1.5 \times 10^6$ centipoise at 25° C.

Stage 36, preparing the top coat paste, is carried out as follows. 100 parts by weight of filtered top coat solution is placed in the pot of a paddle type mixer, 12.5 parts by weight of the pigment master batch is added and 80.63 parts by weight of ground salt taken from sealed cans is added after being sieved through a 60 mesh British Standard screen in the vibratory sieve. This is mixed in the paddle type mixer and milled in the triple roll mill in exactly the same way as the top coat paste in stage 35, and the resultant top coat paste is stored under dry conditions.

To summarize the top coat paste has the following composition:

| | Parts by weight |
|---|---|
| Polyurethane (70–90 centipoise at 25° C.) | 26.86 |
| Ground sodium chloride (average particle diameter 13±4.5 microns (one standard deviation)) | 80.63 |
| Dimethylformamide | 84.38 |
| Carbon black pigment | 1.25 |

It has a viscosity of the order of $1.0 \times 10^6$ centipoise at 25° C.

Figure 2:
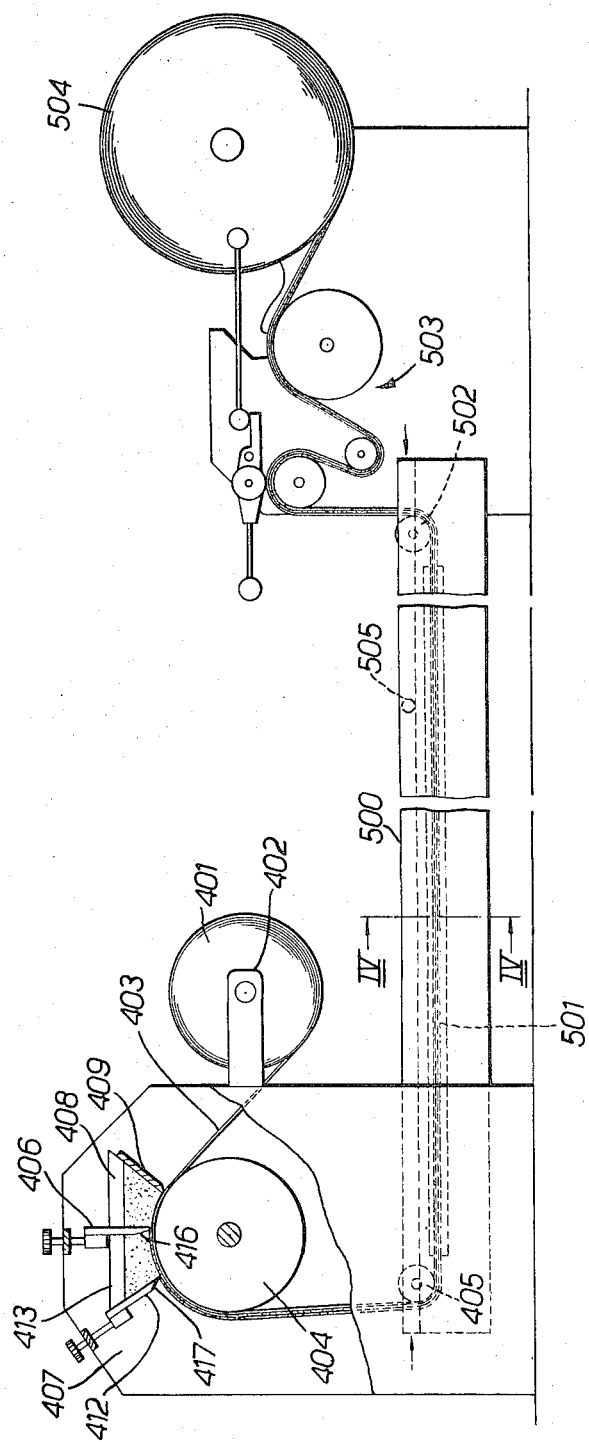
Figure 3:
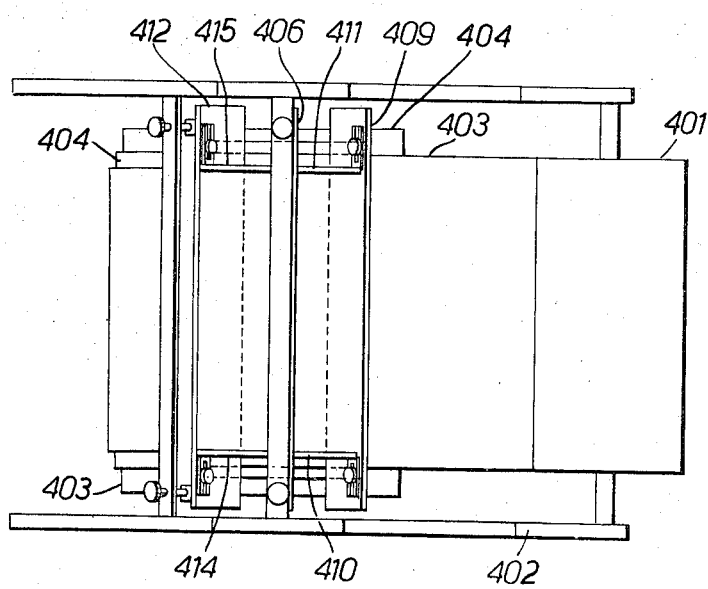
FIG. 3 is a diagrammatic plan view of the two head coating arrangement shown in FIG. 2.
Figure 4:
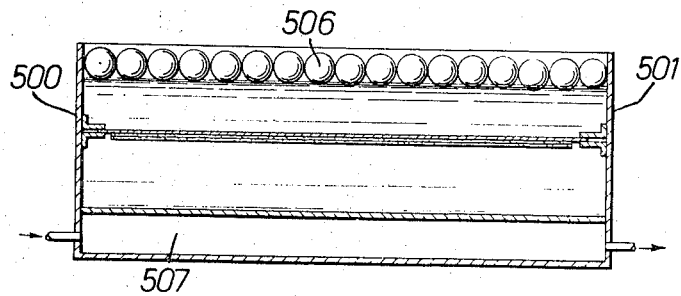
FIG. 4 is a diagrammatic cross-sectional view of the entry end of the coagulating tank 500 taken on the line IX—IX in FIG. 2.

THE TWO-HEAD COATING ARRANGEMENT 400 AND THE COAGULATING TANK 500 (FIGS. 2, 3 AND 4)

The backer 403 which has been stored under dry conditions is mounted as a roll 401 on a braked wind off stand 402. The backer passes round an 18" diameter ground steel spreading roll 404 underneath the two head coating arrangement and down under a guide roll 405 into a coagulating tank 500.

The two head coating arrangement includes a first coating blade 406 located just to the right in FIG. 3 of the center of the roll 404 and adjustably mounted on the stand 407 which supports the roll 404. A trough 408 is formed by a backing plate 409 and cheek pieces 410 and 411 adjustably mounted on the stand 407. A second coating blade 412 is located at about 35° to the first blade 406 and is also adjustably mounted on the stand 407. A second trough 413 is formed between the first and second blades 406 and 412 by cheek pieces 414 and 415 adjustably mounted on the stand 407.

The blades 406 and 412 have chamfered trailing edges 416 and 417 and flat bases.

Stage 40, the formation of the layer of substrate paste on the backer, is carried out as follows:

The substrate paste from the tank is mixed to eliminate any settling of the sodium chloride and de-aired under vacuum in a mixer and then poured into the trough 408.

The blade 406 is set to provide a gap setting between the backer and the blade of 0.100" such that a 0.090" wet coating 18" wide is produced. This layer if leached and dried weighs 450 grams/m.² and is 0.050" or 1.2 mm. thick.

Stage 41, the formation of the layer of top coat paste on the substrate layer, is carried out as follows. The top coat paste is mixed to eliminate any settling of the sodium chloride and de-aired under vacuum in a paddle type mixer and then poured into the trough 413.

The blade 412 is set at a total gap setting between the backer and the blade of 0.135" and produces a wet top coat 0.050" thick. The top coat when leached and dried weighs 200 grams/m.$^2$.

As mentioned above the coated backer enters the tank 500 by passing under a guide 405. Located along the inside of the side walls of the tank 500 are horizontal channels 501 through which slide the uncoated edges of the 22" wide backer. The backer 403 emerges out of the tank around a guide roll 502 and through a constant speed wind up arrangement 503 driven by a variable speed motor and gearing and is fed on to a wind up roll 504.

Stage 50, coagulating both layers, is carried out as follows.

The backer with the two superimposed coats on it is run at 4'/minute into the tank of water maintained at 20° C. with, it will be appreciated, its coated face downwards. The layers are thus immersed within about half a minute of being formed. The entry to the water is done as smoothly as possible so as to avoid the formation of ripples on the surface of the top coat.

Alternatively the coating may be passed through an atomized spray of water just before it is immersed.

The channels 501 and the tension in the backer hold it about 2" below the surface of the water. Fresh water is pumped into the tank from both ends and the level is maintained by an overflow 505 at the center of the tank. The water is maintained at 20° C. by a steam jacket 507 at the bottom of the tank and plastic balls 506 floating on and covering the surface of the water.

The material is passed into the 60 ft. long tank and the total immersion time is 45 minutes. This is to allow the microporous polyurethane which precipitates out of solution in a few minutes to harden off. The material is kept with the coated surface down during this stage to prevent any air in the backer rising or being forced through the polyurethane layers thus forming bubbles or macropores.

The layers of polyurethane contract during precipitation but the backer is tensioned and is such that warping and shrinkage in length or breadth does not occur to any disadvantageous degree.

Stage 55, leaching out the dimethylformamide, is carried out as follows. The material is wound up on a roll 504 which is transferred to a static cold water holding tank 550 (not shown) where the coils of the roll are allowed to loosen slightly. The material is held in this tank until the amount of dimethylformamide left in the material is not sufficient to cause collapse of the porous structure on heating. About two hours are required for this stage.

STAGE 60 LEACHING OUT OF THE SODIUM CHLORIDE

The material from the holding tank 550 is passed in loops and through mangles with loads of about 300 lbs. through a series of leaching tanks arranged so that the water is fed in counter current to the material. This takes about four hours. The water is heated to 60° C. This removes sufficient sodium chloride to result in a satisfactory product.

Stage 65, drying the material, is carried out by passing the wet material, coated side uppermost through an oven at 120° C. in twenty minutes. Any salt remaining tends to be deposited out in the backer rather than in the top coat, and thus does not interfere with the solvent spraying, stage 80.

This temperature and time in the oven does not cause the backer to warp.

STAGE 70, STRIPPING THE MATERIAL FROM THE BACKER

The substrate and top coat material is separated from the backer, taken round the roll past circular edge trimming knives and wound up on a constant speed wind up roll, driven via a friction clutch so as to prevent undue stretching of the material. The backer is returned to the sintering plant for recovery or re-use and the substrate and top coat materials goes to Stage 75, inspection and testing. The material may then be spray-finished as mentioned above.

The material produced by this process after spraying with the solvent has the appearance of a high grade calf grain leather and this man made leather-like material can be used as a replacement for such materials, for example as a men's shoe upper material.

Photomicrographs indicate that it has a fine even interconnecting pore structure.

Figure 5:
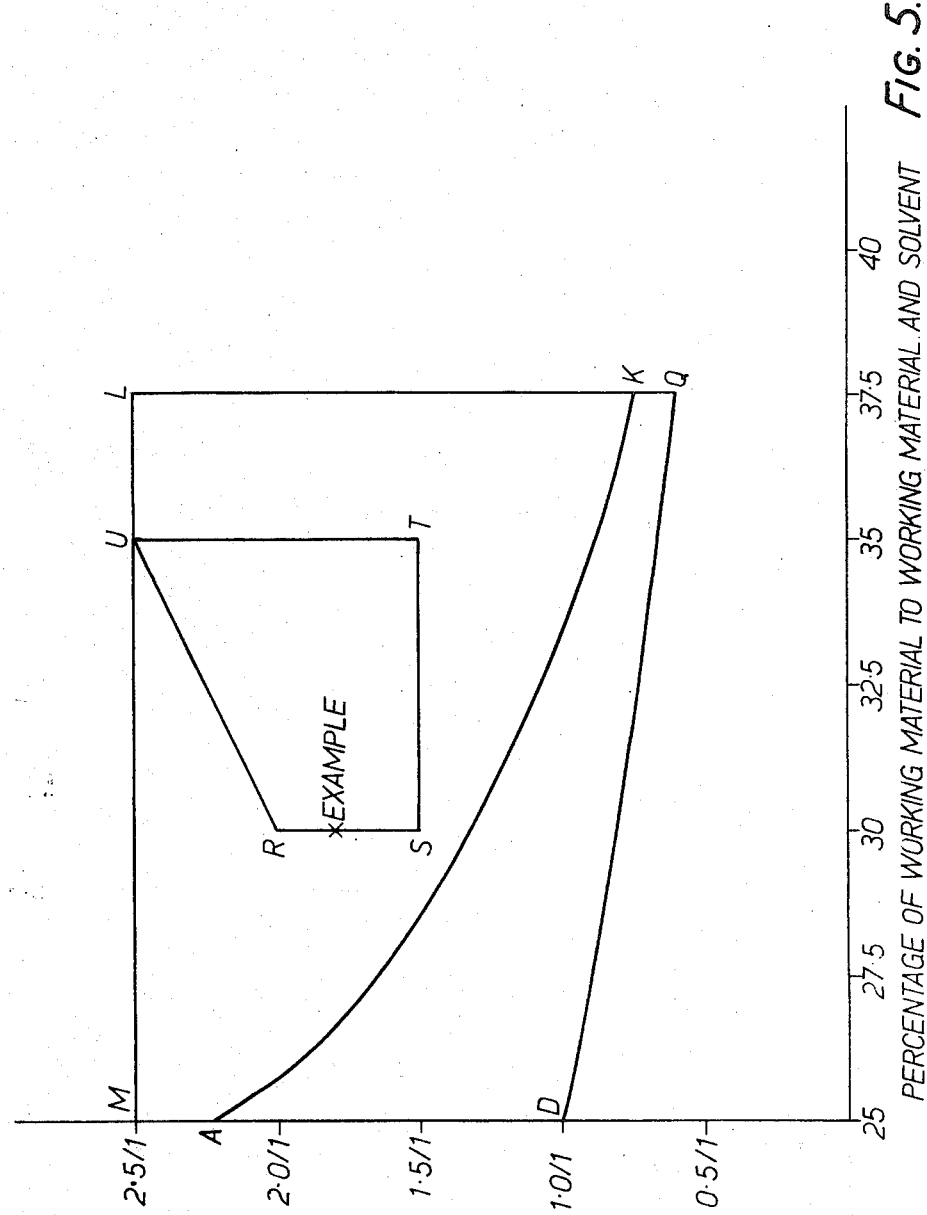
FIG. 5 is a graph with ratios in parts by weight of working material to solvent expressed as percentages of working material as abscissae, and the corresponding ratios in parts by weight of filler to working material as ordinates.

Inspection of FIG. 5 shows that the line M–L is at a 2.5/1 filler/working material ratio, lines A–M and L–K are at solvent percentages of 25% and 37.5% respectively, and point Q is at a 0.6/1 filler/working material ratio and point K is at a 0.75/1 filler/working material ratio.

What is claimed is:

1. Process of making microporous flexible sheet material free from fibrous reinforcement comprising the steps of providing a first spreadable mixture which is a paste consisting essentially of a solution of a film-forming synthetic thermoplastic elastomeric polyurethane working material in a solvent therefor and having microscopic particles of removable filler dispersed therein, the weight ratio of said filler to said elastomeric working material being in the range of 2.5:1 to 0.75:1 and the weight of said elastomeric working material being 25% to 37.5% of the total weight of said solvent plus said elastomeric working material, the composition of said mixture being such that said ratios and percentages fall within the closed area defined by A-K-L-M-A of the accompanying graph, FIG. 1; providing a second spreadable mixture which is a paste consisting essentially of a solution of a film forming synthetic thermoplastic elastomeric polyurethane in solvent therefor and having microscopic particles of removable filler dispersed therein, said first spreadable mixture having more polymer and less removable filler than said second spreadable mixture, said mixtures containing the same solvent and the same removable filler, the weight ratio of said filler to said polyurethane in said second spreadable mixture being up to 6:1 and the weight of polyurethane in said second spreadable mixture being within the range of 20% to 30% of the total weight therein of said solvent plus said polyurethane, forming a continuous layer of said second spreadable mixture in face to face adherent contact with a continuous layer of said first spreadable mixture on a support and then coagulating both said contacting layers, said layers having said compositions, by means of non solvent for the polyurethane of said layers, which non solvent is miscible with the solvent material of said layers, and removing substantially all the solvent by washing the coagulated contacting layers with non solvent for the polymeric material, and leaching said removable filler from said coagulated contacting layers, to form a microporous material having layers of different properties which are adhered to each other and resistant to tearing apart of one layer from the other, and drying the resulting water vapor permeable flexible sheet material, said method including the step of stripping the coagulated material in sheet form from the support, neither of said two layers being less than 0.3 mm. thick, measured after said coagulation and leaching and after removal of liquid.

2. Process of claim 1 and including the further step in which the surface of the second layer of the leached and dried microporous product is sprayed with a solvent for the working material so as to partially collapse the microporous structure of the surface whilst leaving the gas permeability of the treated surface still appreciably greater than that of the working material when in a non porous state, whereby a leather like appearance is imparted to the said surface.

3. Process as in claim 1 in which said coagulation is effected by bathing the composite of said contacting layers in liquid non-solvent.

4. Process as in claim 1 in which said layer of said first mixture is of such thickness that after said coagulation and leaching and after removal of liquid therefrom it has a thickness in the range of 1.1 to 1.3 mm. and said layer of said second mixture is of such thickness that after said coagulation and leaching and after removal of liquid from said layers the total thickness of said two layers is in the range of 1.6 to 1.8 mm.

5. Process of making microporous flexible sheet material as claimed in claim 1 in which for both layers the filter is sodium chloride, the polymer in each of said mixtures comprising thermoplastic elastomeric polyurethane derived from a polyester by reaction with a diol and a di-isocyanate, the solvent comprises dimethylformamide, and the mixtures are formed by dissolving the polyurethane in the dimethylformamide and then milling dried sodium chloride into the solution under conditions of low humidity until a homogeneous dispersion is obtained.

6. Process as claimed in claim 5 in which the moisture content of the sodium chloride is in the range 0.2–0.4% by weight and the milling conditions are not more humid than 50% RH at 25° C.

7. Process as claimed in claim 1 in which the viscosity of the first layer mixture is greater than that of the second layer mixture and layers are knife coated onto the support as it passes around a roll the first layer being applied to the support between a first knife and an upstream inclined backing plate located before the first knife from the point of view of the movement of the backer and the second layer is applied between the first knife and a second knife located downstream from the first knife, the second layer thus being applied immediately on top of the first layer.

8. Process as claimed in claim 7 in which the coagulation is carried out by immersing the layers coated face downwards on the backer in water at 20° C.

9. Process as claimed in claim 8 in which the material is immersed in the cold in the coagulating liquid until insufficient solvent remains to cause collapse of the porous structure on heating and then the filler is removed to an adequate level by mangling the material in heated coagulating liquid, which is passed in counter-current to the material.

10. Process as in claim 1 in which the solvent in said second mixture is a solvent for the polymer of said first mixture.

11. Process as in claim 10 in which the polymer in each of said mixtures is a thermoplastic elastomeric polyurethane and in which the solvent in each of said mixtures is selected from the group consisting of dimethyl formamide, dimethyl sulphoxide, N-methyl pyrrolidone and dimethyl acetamide.

12. Process as in claim 11 in which both of said mixtures have microscopic sodium chloride particles dispersed therein, and said non-solvent is aqueous.

13. Process as in claim 1 in which the solvent in both mixtures is dimethyl formamide.

14. Process as in claim 1 in which the polymer in each of said mixtures is a thermoplastic elastomeric polyurethane derived from a polyester by reaction with a diol and a di-isocyanate, the polyester comprising the condensation reaction product of adipic acid, part ethylene glycol and part 1,4-butylene glycol, the diol comprising 1,4-butylene glycol and the di-isocyanate comprising 4,4'-diphenylmethane-di-isocyanate, the isocyanate being used in a very slight molar excess.

15. Product of the process of claim 1.

16. Product of the process of claim 2.

References Cited

UNITED STATES PATENTS

| | | | |
|---|---|---|---|
| 2,707,201 | 4/1955 | Fernald et al. | 264—49 UX |
| 2,810,932 | 10/1957 | Honey et al. | 264—49 |
| 3,100,721 | 8/1963 | Holden | 264—41 UX |
| 3,190,765 | 6/1965 | Yuan | 264—41 UX |
| 2,953,622 | 9/1960 | Gray | 136—146 X |
| 3,035,110 | 5/1962 | Corren | 136—146 X |
| 3,188,243 | 6/1965 | Booth et al. | 136—146 X |
| 2,941,898 | 6/1960 | Wynn | 117—34 |
| 3,476,841 | 11/1969 | Bienert | 264—341 X |
| 3,524,753 | 8/1970 | Sharp | 264—49 X |
| 3,689,629 | 9/1972 | Hull | 264—341 |

FOREIGN PATENTS

| | | |
|---|---|---|
| 1,011,456 | 12/1965 | Great Britain. |

PHILIP E. ANDERSON, Primary Examiner

U.S. Cl. X.R.

117—161 KP; 161—160, 161; 264—46, 48, 49, 341, DIG. 13, DIG. 62, DIG. 77